United States Patent [19]
Nekomoto et al.

[11] Patent Number: 5,583,525
[45] Date of Patent: Dec. 10, 1996

[54] CAPACITIVE COUPLING

[75] Inventors: Yoshihiko Nekomoto, Isehara; Yoshitaka Utsumi, Chigasaki, both of Japan

[73] Assignee: NCR Corporation, Dayton, Ohio

[21] Appl. No.: 653,985

[22] Filed: May 28, 1996

Related U.S. Application Data

[63] Continuation of Ser. No. 394,928, Feb. 24, 1995, abandoned, which is a continuation of Ser. No. 252,148, Jun. 1, 1994, abandoned, which is a continuation of Ser. No. 892,452, Jun. 2, 1992, abandoned.

[30] Foreign Application Priority Data

Aug. 30, 1991 [JP] Japan .................................. 3-244322

[51] Int. Cl.⁶ .................................................. G09G 5/00
[52] U.S. Cl. ........................ 345/2; 235/383; 340/825.35; 333/24 C
[58] Field of Search ..................................... 235/383, 385; 345/1, 2, 3, 903; 333/24 C; 340/825.07, 825.15, 825.35; 364/403, 404, 405

[56] References Cited

U.S. PATENT DOCUMENTS

| | | | |
|---|---|---|---|
| 4,002,886 | 1/1977 | Sundelin | 340/825.35 |
| 4,339,668 | 7/1982 | Mueller et al. | 333/24 C |
| 4,500,880 | 2/1985 | Gomersall et al. | 340/717 |
| 4,613,833 | 9/1986 | Harada | 333/24 C |
| 4,766,295 | 8/1988 | Davis | 235/383 |
| 4,888,709 | 12/1989 | Revesz et al. | 340/825.07 |
| 5,510,602 | 4/1996 | Evans et al. | 235/385 |
| 5,544,041 | 8/1996 | Nekomoto | 364/405 |

*Primary Examiner*—Richard Hjerpe
*Assistant Examiner*—Kara Farnandez Stoll
*Attorney, Agent, or Firm*—Craig E. Miller

[57] ABSTRACT

A capacitive coupling arrangement including a plate-shaped input/output terminal of a signal line and a plate-shaped input/output terminal of a price display unit. These input/output terminals are connected together separated by a small gap and the respective input/output terminals are capacitively coupled. Amplifiers are connected to the input/output terminals as necessary to amplify the signal being transmitted across the capacitive coupling.

13 Claims, 5 Drawing Sheets

CAPACITIVE COUPLING

This is a continuation of application Ser. No. 08/394,928 filed on Feb. 24, 1995, abandoned, which is a continuation of Ser. No. 08/252,148, filed Jun. 1, 1994, abandoned, which is a continuation of Ser. No. 07/892,452 filed Jun. 2, 1992 abandoned.

BACKGROUND OF THE INVENTION

The present invention relates generally to new and novel arrangements and methods of connecting input/output terminals together. More particularly, the present invention relates to arrangements and methods to provide capacitive couplings between input/output terminals without physical contact therebetween, such as the input/output terminals associated with signal lines and price display units.

In many prior art devices, the input/output terminal of a electrically transmitting data signal line is physically brought into contact with the input/output terminal of a price display unit for data communication to be transmitted therebetween. Such physical contact establishes a channel for transferring a signal consisting of data and the like.

However, if attachment and detachment of the respective input/output terminals is repeated frequently, a connection by physical contact is liable to induce a poor connection. In particular, in instances where connected parts are exposed to vibration or shock the possibility of a poor connection occurring is increased.

SUMMARY OF THE INVENTION

Accordingly, an object of the present invention is the provision of an arrangement of connecting input/output terminals such that the likelihood of a poor connection occurring therebetween is minimized.

This and other objects of the present invention are attained by the provision of a plate-shaped input/output terminal of a signal line and a plate-shaped input/output terminal of a price display unit. These input/output terminals are connected together separated by a small gap and the respective input/output terminals are capacitively coupled. Amplifiers are connected to the input/output terminals as necessary to amplify the signal being transmitted across the capacitive coupling.

Other objects, advantages and novel features of the present invention will become apparent in the following detailed description of the invention when considered in conjunction with the accompanying drawings.

DETAILED DESCRIPTION OF THE PREFERRED EMBODIMENTS

Figure 1:
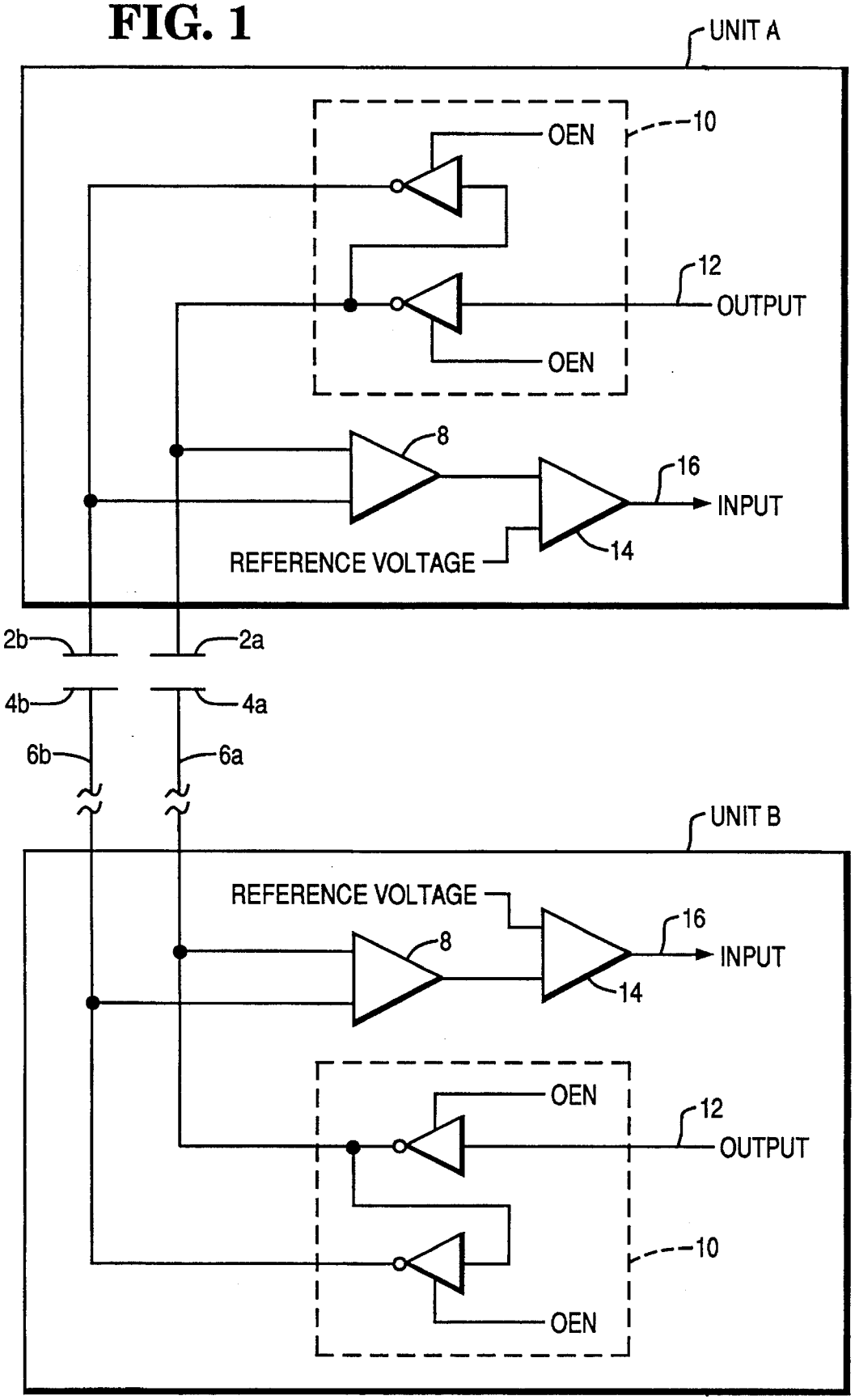
FIG. 1 is a schematic circuit diagram of a capacitive coupling in accordance with the present invention.

Referring now to the drawings, in which like-referenced characters indicate corresponding elements throughout the several views, attention is first directed to FIG. 1 which is a schematic circuit diagram of one embodiment of a capacitive coupling in accordance with the present invention. In this drawing, as signal lines, data lines $6a$ and $6b$ are shown. Preferably, inverted data signals are sent on data lines $6a$ and $6b$ simultaneously with the transfer of positive data in order to improve the reliability of the data transfer. Thus, the data signal transmitted from one unit A or B is sent to the other unit A or B through input/output terminals together with an inverted data signal through output driver 10. The reason for the transmission of the data signal together with the inverted data signal is that in the capacitive coupling, voltage appearing at a sink side plate is low and hence is liable to be influenced by external interference and noise on the transmission line. Thus, the difference in voltage is offset by an amount corresponding to the noise fluctuation to improve the transmission accuracy. If there is no need to take this matter into consideration, the data signal may be transmitted without the inverted data signal. The received signal is amplified and the signal may be converted to a digital signal by comparing the voltage at the line with a reference voltage.

Next, the structure of the present invention will be described. Output driver 10, differential amplifier 8 for amplifying an input signal and comparator 14 for converting the amplified analog signal into a digital signal are provided in each of units A and B. Units A and B are connected to each other via data lines $6a$ and $6b$. Unit A input/output terminals $2a$ and $2b$ and data lines $6a$ and $6b$ are connected such that they are separated by a gap of several millimeters to allow unit A and data lines $6a$ and $6b$ to be capacitively coupled together. In this embodiment, only the connection between unit A and data lines $6a$ and $6b$ is made by capacitive coupling and the connection between unit B and data lines $6a$ and $6b$ is made by a conventional connection system (such as a connector or the like). However, it will be recognized by those having ordinary skill in the relevant art that the connection between unit B and data lines $6a$ and $6b$ could also be capacitively coupled, particularly if data lines $6a$ and $6b$ are relatively short. In this case, the signal received by input/output terminal 2a is considerably weaker, and it may be necessary to increase the amplification of the received signal to minimize the extent and influence of external interference and noise.

Next, the operation of the individual elements will be described with reference to a case where data is transmitted from unit A to unit B. When data is ready to be transmitted, a transmission allow signal (OEN) is output from a controller (not shown) to bring output driver 10 into a transmissible state. The data signal and inverted data signal are output from data line 12 of unit A to input/output terminals 2a and 2b. When the data signal and the inverted data signal are output to input/output terminals 2a and 2b, analog signals corresponding to the data signal and the inverted data signal appear at input/output terminals 4a and 4b. Thus, the data signal and the inverted data signal are transferred from input/output terminals 2a and 2b to input/output terminals 4a and 4b. The analog signals transferred are then transmitted to unit B on data lines 6a and 6b. Differential amplifier 8 amplifies the analog data signals received by Unit B. The amplified analog signals are then converted into digital signals by comparator 14 comparing the voltage of the amplified analog signals with a reference voltage. The converted digital signals are then input into unit B via inner data line 16. Data transmission from unit B to unit A is performed in the same manner as above.

Figure 2A:
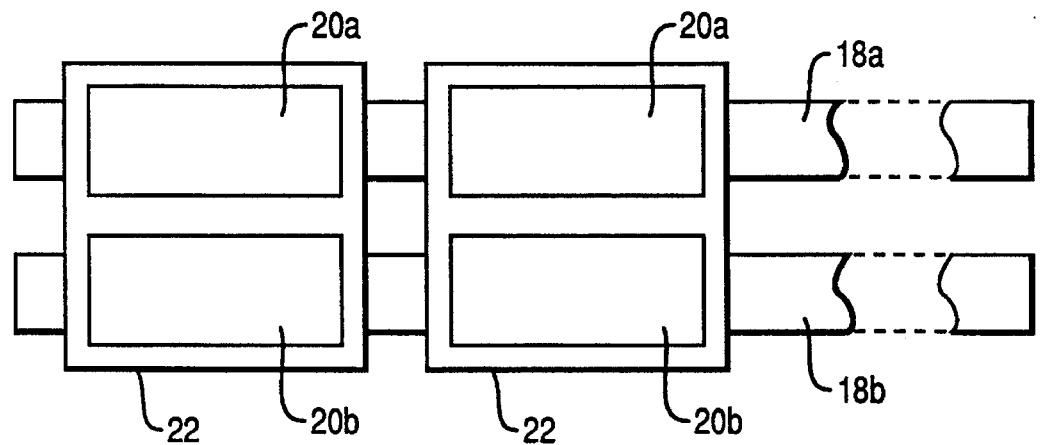
FIG. 2A is a schematic diagram of the capacitive coupling in accordance with the present invention showing the relationship between a belt-shaped input/output terminal on a signal line and a belt-shaped input/output terminal on a price display unit.
Figure 2B:
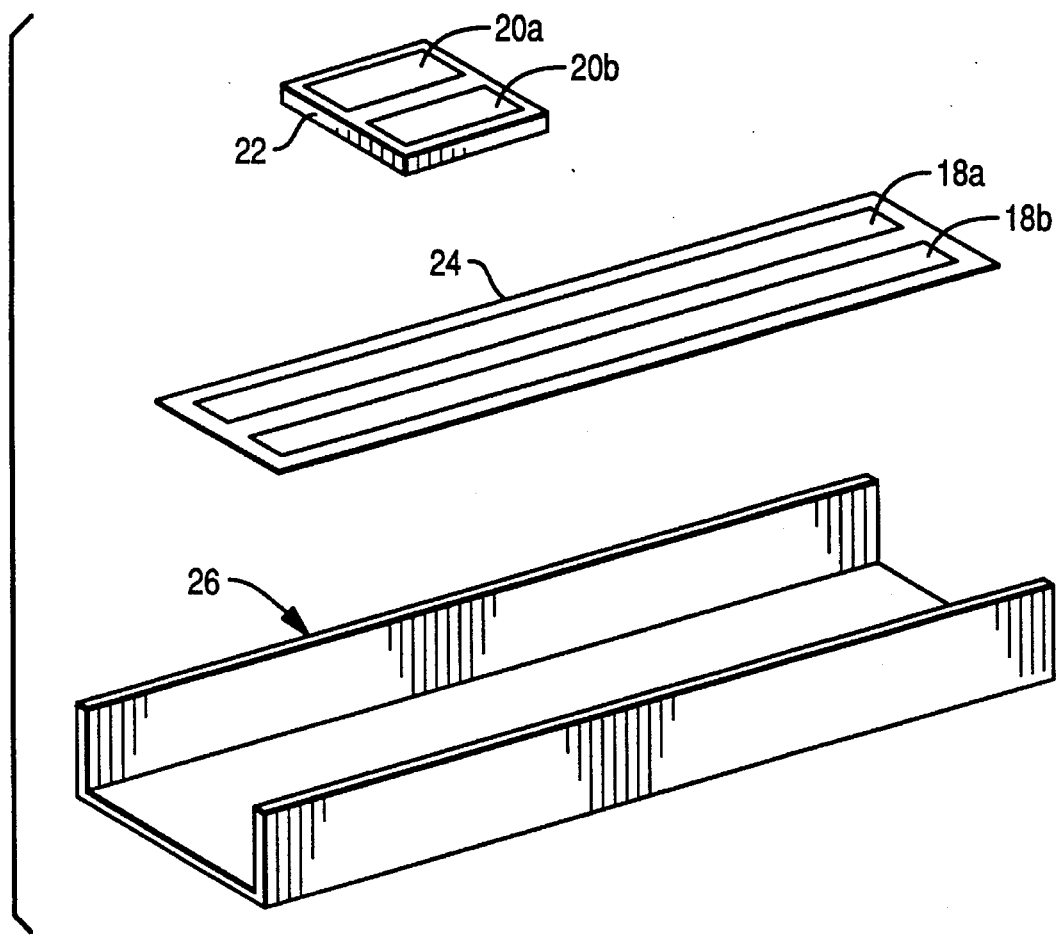
FIG. 2B is an exploded perspective view of the capacitive coupling in accordance with the present invention showing the relationship between the belt-shaped input/output terminal on the signal line and the belt-shaped input/output terminal on the price display unit as shown in FIG. 2A.

Referring now to FIGS. 2A and 2B, a second embodiment in which a plurality of elongated belt-shaped input/output terminals are provided for input/output terminals 4a and 4b will be described. Input/output terminals 18a and 18b, preferably fabricated from elongated copper tapes, correspond to input/output terminals 4a and 4b shown in FIG. 1. Similarly, input/output terminals 20a and 20b, preferably fabricated from short copper tapes, correspond to input/output terminals 2a and 2b shown in FIG. 1. As seen in FIG. 2A, a plurality of input/output terminals 20a and 20b may be provided corresponding to a single set of input/output terminals 18a and 18b.

Input/output terminals 20a and 20b are arranged so as to confront input/output terminals 18a and 18b through a relatively thin insulator 22, preferably a molded plastic or film member. Thus, depending on the thickness of insulator 22, a proper gap is maintained between input/output terminals 20a and 20b and input/output terminals 18a and 18b.

Input/output terminals 18a and 18b are fixed onto conductive supporting member 26, preferably fabricated from a conductive material such as aluminum or the like, through a relatively thin insulator 24, preferably a paper member or the like. Conductive supporting member 26 is connected to a ground. Insulator 24 is positioned in conductive supporting member 26 because input/output terminals 18a and 18b may act as antennae and hence may be liable to pick up external interference and noise. Accordingly, input/output terminals 18a and 18b should be adequately shielded to minimize the reception of such external interference and noise.

Figure 3A:
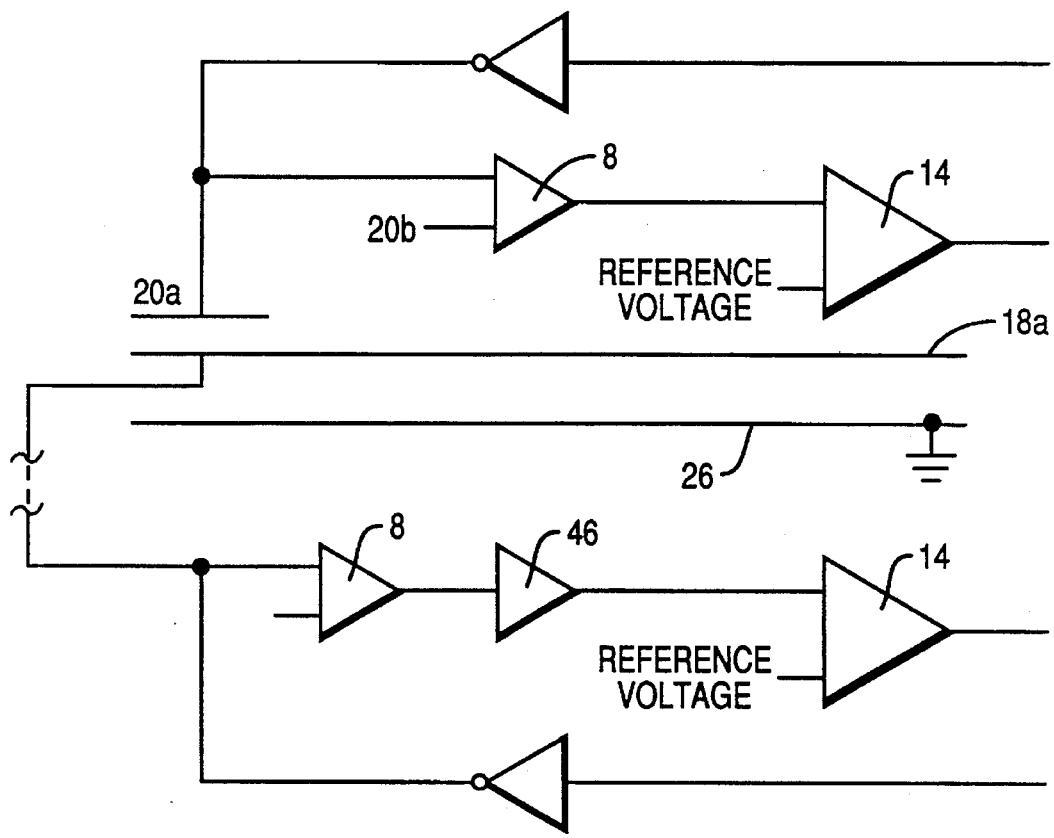
FIG. 3A is a schematic circuit diagram of the capacitive coupling in accordance with the present invention showing the shielding of the belt-shaped input/output terminal on the signal line.
Figure 3B:
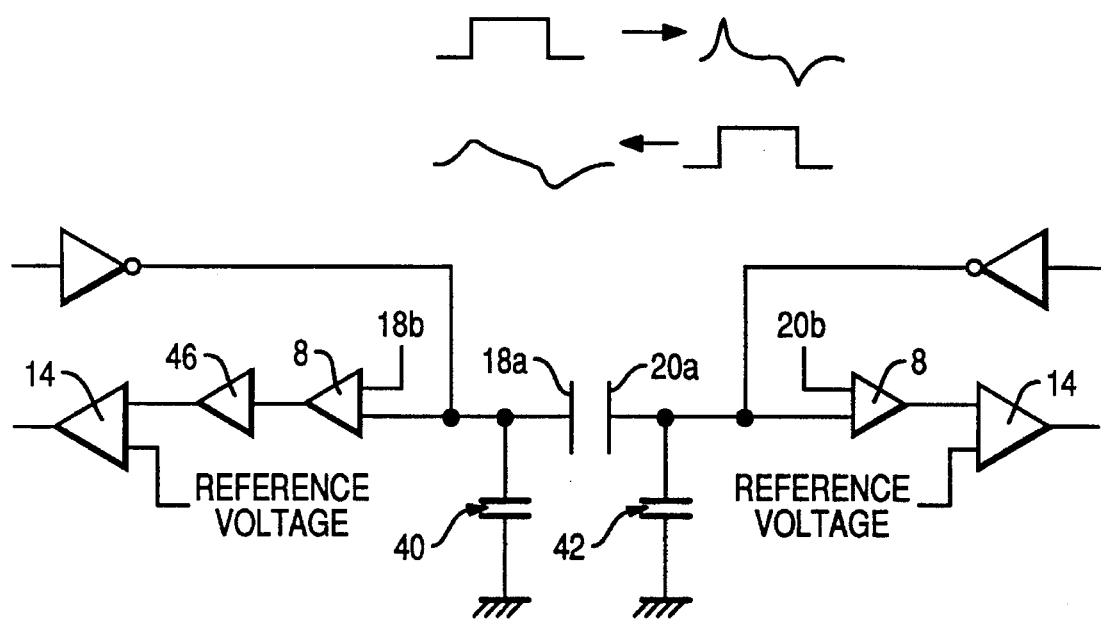
FIG. 3B is a simplified equivalent schematic circuit diagram of the capacitive coupling in accordance with the present invention showing the shielding of the belt-shaped input/output terminal on the signal line as shown in FIG. 3A.

Referring now to FIGS. 3A and 3B, input/output terminals 18a and 20a include capacitances 40 and 42, respectively, located near the ground. Input/output terminal 18a is closer to conductive supporting member 26 than input/output terminal 20a. Also, the width of input/output terminal 18a confronting input/output terminal 20a is wider than input/output terminal 20a. Therefore, capacitance 40 is typically larger than capacitance 42. In other words, the signal appearing at input/output terminal 18a when a signal is transmitted from input/output terminal 20a is smaller than that obtained when a signal is transmitted from input/output terminal 18a to input/output terminal 20a.

Typical examples of transmitted waveforms are shown at the top portion of FIG. 3B. The top row waveform is of the analog signal obtained at input/output terminal 20a when a digital signal is transmitted from input/output terminal 18a. Similarly, the bottom row waveform is of the analog signal obtained at input/output terminal 18a when a digital signal is transmitted from input/output terminal 20a. As is apparent from this drawing, the waveform obtained (the lower left waveform) when the signal is received by input/output terminal 18a is smaller due to the influence of capacitance 40. Therefore, it is desirable to further amplify the output from differential amplifier 8 by amplifier 46 in unit B on the input/output terminal 18a side. The output from amplifier 46 is then converted into a digital signal by comparator 14.

Figure 4:
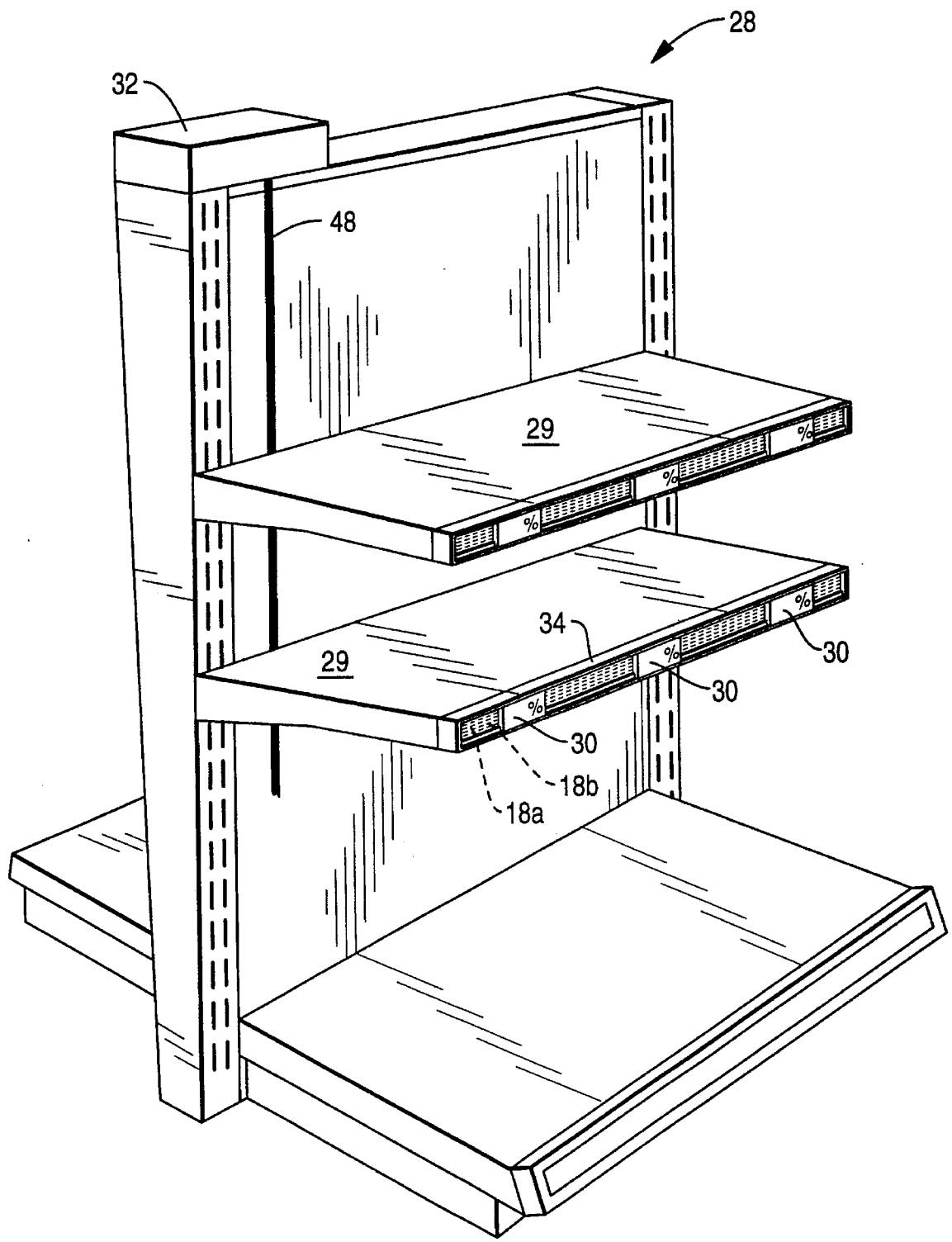
FIG. 4 is a perspective view of the capacitive coupling in accordance with the present invention showing a merchandise display gondola having a plurality of price displays on merchandise display shelves and a group controller for data communication with the plurality of price displays.

Referring now to FIG. 4, a merchandise display gondola utilizing the capacitive coupling of the present invention in conjunction with a price display system is shown. Merchandise display gondola 28 includes a plurality of price displays 30 and group controller 32 for data communication with the plurality of price displays 30. For example, each of the plurality of price displays 30 correspond to unit A in FIG. 1 and group controller 32 corresponds to unit B. Preferably, one group controller 32 is provided on each merchandise display gondola 28 and data line 48, for example, corresponding to signal lines 6a and 6b in FIG. 1, extends from group controller 32 to each of the plurality of price displays 30. Data line 48 is branched for each of a plurality of display shelves 29 such that branch lines of data line 48 are in parallel with one another. Input/output terminals 18a and 18b are connected to a branch line of data line 48. In addition, input/output terminals 18a and 18b are fixed onto conductive supporting member 34 which is grounded. Input/output terminals 20a and 20b are attached onto conductive supporting element 34 so as to confront input/output terminals 18a and 18b.

As has been described above, in this embodiment, a plurality of input/output terminals 18a and 18b are connected to a single data line 48. However, the connection of input/output terminals 18a and 18b in the above mentioned manner results in the larger capacitance 40 as described in conjunction with FIG. 3B and the smaller signal being received by input/output terminals 18a and 18b. If such an arrangement causes difficulties in data communication, separate data lines extending from group controller 32 should be provided for each set of input/output terminals 18a and 18b on each display shelf 29. Furthermore, a separate amplifier 8 and comparator 14 should be provided for each such data line.

Figure 5A:
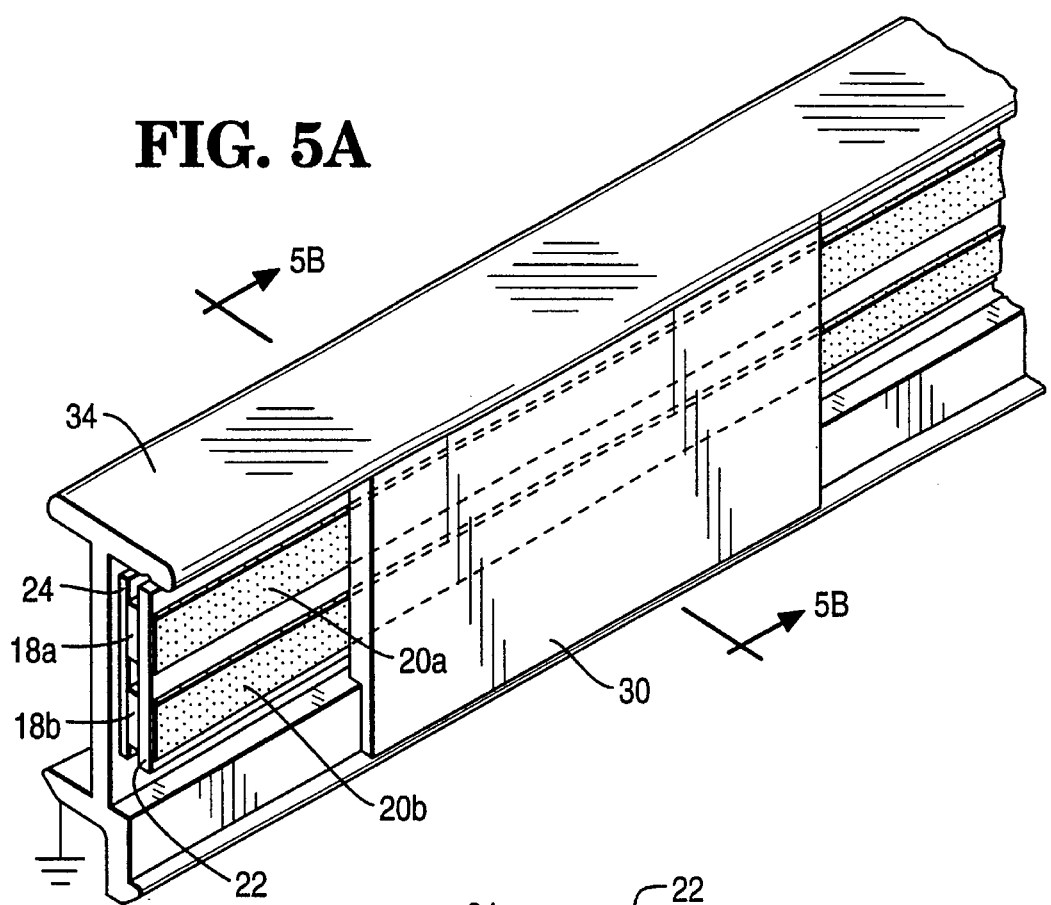
FIG. 5A is a perspective view of the capacitive coupling in accordance with the present invention showing an individual price display attached onto a supporting member.
Figure 5B:
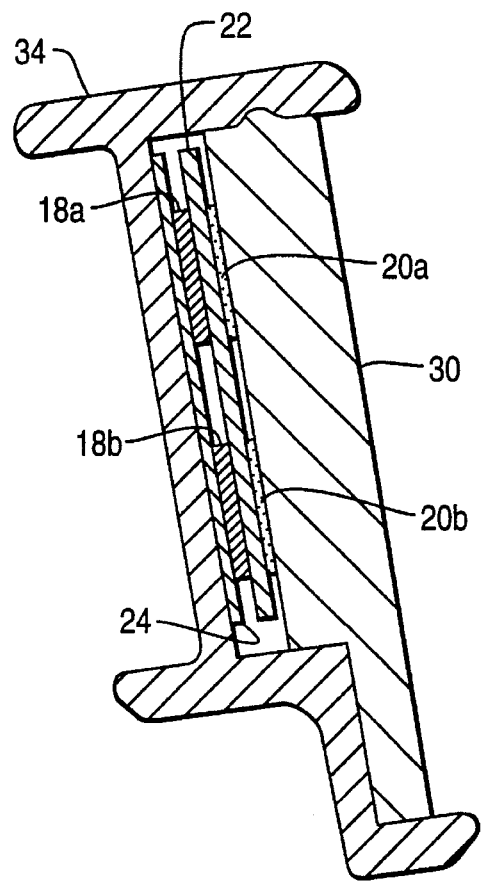
FIG. 5B is a cross-sectional view of the capacitive coupling in accordance with the present invention showing the individual price display attached onto the supporting member taken across lines 5B—5B in FIG. 5A.

Referring now to FIGS. 5A and 5B, a detailed structure of the attaching portions of input/output terminals 18a and 18b attached onto conductive supporting member 34 and price display 30 is shown. For the convenience of description, display shelves 29, group controller 32 and the like are omitted from these drawings. FIG. 5A shows price display 30 attached onto conductive supporting member 34. Input/output terminals 20a and 20b as previously described are shown attached to price display 30.

Conductive supporting member 34 is preferably fabricated from a conductive material, such as aluminum or the like, and is grounded. Input/output terminals 18a and 18b are attached onto conductive supporting member 34 through insulator 24, preferably fabricated from a thin plastic or film member. Similarly, input/output terminals 18a and 18b are covered with insulator 22, preferably fabricated from paper or a thin film member. As an alternative, insulator 38 may be provided on the display side so as to cover input/output terminals 20a and 20b. Since the space between input/output terminals 18a and 18b, and input/output terminals 20a and 20b, is dependent on the thickness of insulator 38, the gap separating these elements can be accurately defined and maintained.

In a system in which the attachment and detachment of price displays 30 are frequently repeated, as is the case in many price display systems, it may be desirable to provide a battery on each price display 30 to permit price displays 30 to be operated by the battery. Such a battery power source can save time and labor in power source wiring work upon the detachment or change of arrangement of price displays 30.

In the case where price displays 30 are powered by a battery as described above, the ground level of price displays 30 and the ground level of group controller 32 may be different from each other unless their respective ground lines are connected together. If the ground levels are different, even if there is no need to take the influence of external interference and noise into consideration, the system is preferably constructed such that input/output terminals 2a and 2b and input/output terminals 4a and 4b are provided as shown in FIG. 1. In such an arrangement, the presence or absence of the received data signal is detected in accordance with a difference in voltage between the data signals received by the respective pairs of input/output terminals, 18a and 20a, and 18b and 20b.

As has been described above, in accordance with the present invention, input/output terminals may be connected together by a capacitive coupling to eliminate physical contact between the input/output terminals. Such a capacitive coupling minimizes the likelihood of poor physical contact between the input/output terminals due to vibration, corrosion and the like. Thus, the reliability of data transfer between the input/output terminals is improved.

In the present embodiment, input/output terminals 20a and 20b are shaped into a long belt-shaped configuration by which a plurality of input/output terminals 18a and 18b can be readily connected to a single set of input/output terminals 20a and 20b. In addition, the positive and inverted data signals are transmitted at the same time with the use of the two input/output terminals 18a and 18b, and 20a and 20b, to amplify the difference between the transmitted data signals. Such an arrangement allows the data signals to be transmitted and received via the capacitive coupling even when the reference voltage is not common between the units.

Although the present invention has been described above in detail, the same is by way of illustration and example only and is not to be taken as a limitation on the present invention. The scope and content of the present invention are to be defined only by the terms of the appended claims.

What is claimed:

1. An electronic price display system, comprising:

at least one electronic price display;

a group controller for transmitting data via a data signal to said at least one electronic price display;

a data line connected to said group controller for carrying said data signal transmitted by said group controller;

a first input/output terminal connected to said data line distal from said connection of said data line with said group controller, said first input/output terminal carrying said data signal transmitted by said group controller and transmitting said data signal transmitted by said group controller via a first noninverted data signal and a second inverted data signal;

a second input/output terminal connected to said at least one electronic price display, said second input/output terminal capable of receiving said data signal transmitted by said group controller via said first noninverted data signal and said second inverted data signal transmitted by said first input/output terminal;

a capacitive coupling connecting said first input/output terminal with said second input/output terminal without physical contact therebetween to permit transmission of said data via said data signal from said first input/output terminal to said second input/output terminal; and a differential amplifier connected to said second terminal for amplifying the difference between said first noninverted data signal and said second inverted data signal.

2. The electronic price display system in accordance with claim 1, wherein said first input/output terminal is shielded from external interference and noise and said at least one electronic price display is mounted on a grounded conductive support member.

3. The electronic price display system in accordance with claim 2, wherein said at least one electronic price display is capable of being operated by a battery power source.

4. The electronic price display system in accordance with claim 3, wherein said data signal transmitted by said group controller is a digital signal and said second input/output terminal includes a digital to analog converter which converts said digital signal received from said first input/output terminal into an analog signal.

5. The electronic price display system in accordance with claim 1, wherein said data signal transmitted by said group controller is a digital signal and said second input/output terminal includes a digital to analog converter which converts said digital signal received from said first input/output terminal into an analog signal.

6. An electronic price display system, comprising:

a merchandise display gondola having a plurality of merchandise display shelves;

a plurality of electronic price displays connected to said plurality of merchandise display shelves;

a group controller mounted to said merchandise display gondola capable of transmitting data via a data signal to said plurality of electronic price displays;

a data line extending from said group controller for carrying said data signal from said group controller;

at least one first input/output terminal attached to said data line distal from the connection between said data line and said group controller, said at least one first input/output terminal transmitting said data signal received from said group controller via a first noninverted data signal and a second inverted data signal;

a plurality of second input/output terminals capable of receiving said first noninverted data signal and said second inverted data signal transmitted by said first input/output terminal, one of said plurality of second input/output terminals connected to each of said plurality of electronic price displays; and a capacitive coupling connecting said at least one first input/output terminal to said plurality of second input/output terminals without physical contact therebetween to permit transmission of said data via said data signal from said at least one first input/output terminal to said plurality of second input/output terminals; and a differential amplifier connected to each of said second input/output terminals which amplifies the difference between said first noninverted data signal and said second inverted data signal.

7. The electronic price display system in accordance with claim 6, wherein said data line has a plurality of separate branches for each of said plurality of merchandise display shelves and each of said plurality of separate branches of said data line are capable of servicing one or more of said plurality of electronic price displays.

8. The electronic price display system in accordance with claim 6, wherein said data line has a plurality of separate branches for each of said plurality of merchandise display shelves and each of said plurality of separate branches of said data line services all of said plurality of electronic price displays mounted on each of said plurality of merchandise display shelves associated with said plurality of separate branches of said data line.

9. The electronic price display system in accordance with claim 6, wherein said plurality of electronic price displays are capable of being operated by a battery power source.

10. The electronic price display system in accordance with claim 9, wherein said data signal transmitted by said group controller is a digital signal and each of said plurality of second input/output terminals include a digital to analog converter which converts said digital signal received from said at least one first input/output terminal into an analog signal.

11. The electronic price display system in accordance with claim 6, wherein said data signal transmitted by said group controller is a digital signal and each of said plurality of second input/output terminals include a digital to analog converter which converts said digital signal received from said at least one first input/output terminal into an analog signal.

12. An electronic price display system, comprising:

a plurality of merchandise display shelves;

a plurality of electronic price displays connected to said plurality of merchandise display shelves;

a controller for transmitting data via a data signal to said plurality of electronic price displays;

a data line extending from said controller to carry said data signal from said controller;

a plurality of first input/output terminals attached to said data line distal from the connection between said data line and said controller, each of said plurality of first input/output terminals transmitting said data signal received from said controller via a first noninverted data signal and a second inverted data signal;

a plurality of second input/output terminals capable of receiving said first noninverted data signal and said second inverted data signal transmitted by each of said first input/output terminal, one of said plurality of second input/output terminals connected to each of said plurality of electronic price displays;

a capacitive coupling connecting said at least one first input/output terminal to said plurality of second input/output terminals without physical contact therebetween to permit transmission of said data via said data signal from said at least one first input/output terminal to said plurality of second input/output terminals; and a differential amplifier connected to each of said plurality of second input/output terminals which amplifies the difference between said first noninverted data signal and said second inverted data signal.

13. The electronic price display system according to claim 12, further comprising:

an analog to digital converter connected to said differential amplifier.

* * * * *